United States Patent [19]
Ricca et al.

[11] 3,738,410
[45] June 12, 1973

[54] FILM EVAPORATOR PANEL

[75] Inventors: Peter M. Ricca, Bellevue; William W. Stickney, Mercer Island; Robert W. Turner, Seattle, all of Wash.

[73] Assignee: The Boeing Company, Seattle, Wash.

[22] Filed: May 10, 1971

[21] Appl. No.: 141,859

[52] U.S. Cl................. 159/13 B, 159/43, 159/45, 159/28 P, 202/236
[51] Int. Cl....... B01d 1/22, B01d 1/00, B01d 3/08, B01d 3/28
[58] Field of Search .................... 159/13, 13 A, 28, 159/26, 13 B, 28 P, 43, 45; 165/115, 117, 166, 165; 122/39; 62/439; 202/236

[56] References Cited
UNITED STATES PATENTS

| | | | |
|---|---|---|---|
| 228,542 | 6/1880 | Lister | 159/13 B |
| 421,163 | 2/1890 | Collings | 159/13 B |
| 585,819 | 7/1897 | Hugill et al. | 165/115 |
| 1,506,001 | 8/1924 | Hughes | 159/13 B |
| 1,615,287 | 1/1927 | McLaughlin | 159/26 A X |
| 1,974,402 | 9/1934 | Templeton | 165/117 X |
| 3,351,120 | 11/1967 | Goeldner | 159/13 B |
| 3,371,709 | 3/1968 | Rosenblad | 159/13 B X |

FOREIGN PATENTS OR APPLICATIONS

| | | | |
|---|---|---|---|
| 404,071 | 1/1934 | Great Britain | 165/117 |
| 749,286 | 7/1933 | France | 165/166 |

*Primary Examiner*—Norman Yudkoff
*Assistant Examiner*—J. Sofer
*Attorney*—Glenn Orlob, Kenneth W. Thomas and Nicolaas De Vogel

[57] ABSTRACT

An evaporator panel having extruded sections placed one on top of another, each with a plurality of passages positioned within a pair of smooth parallel exterior walls. The passages are open at their ends, and steam headers are located on both ends of the panel to permit a uniform flow of steam throughout the passages within the panel. The passages within the panel are slightly tilted from horizontal so that steam condensate that collects within the passages flows into one of the steam headers which has thus a double function, that of supplying steam and of collecting condensate. The condensate is removed through an outlet at the bottom of the double-functioned header.

8 Claims, 3 Drawing Figures

INVENTORS,
WILLIAM W. STICKNEY
PETER M. RICCA
ROBERT W. TURNER

AGENT

FILM EVAPORATOR PANEL

BACKGROUND OF THE INVENTION

1. Field of the Invention

This invention relates to a falling film evaporator and particularly to an evaporator used for desalination where a brine distilland flows downwardly over the exterior walls of the evaporator panels.

2. Description of the Prior Art

Evaporator panels used in distillation desalination units are currently fabricated either in the form of vertical tube bundles or as vertical flat plates. Brine is vaporized from one surface while steam is condensed on the opposing area. These types of panels can usually be categorized as parallel or counter flow heat exchangers. Various devices and flow impediments are used to control the thickness of the condensate film in an attempt to provide a relatively high heat transfer coefficient. In these designs, fabrication costs are expensive and maintenance is costly.

The presently disclosed evaporator panel comprises sections which are extruded in a form having two opposed and parallel wall surfaces separated by a plurality of passages created by a plurality of dividers extending substantially perpendicularly with respect to the sidewalls and in parallel relationship with each other. The evaporator panel sections are positioned one on top of another and in fluid communication with steam headers at the ends of the panel to provide for parallel steam flow therethrough.

The prior art does teach the concept of using horizontal crossflow steam channels in an evaporator with the channels being inclined to permit condensate discharge. The broad concept of using headers at the end of horizontal panels is more or less shown by the Rosenblad, U.S. Pat. No. 3,371,709, Lister, U.S. Pat. No. 228,542.

The use of individual removable panel units which may be stacked to form banks of panels is shown to some degree by Lister. However, in Lister the units are comprised only of steam boxes joined together by horizontal pipes. However, the use of panels having parallel sidewalls with closely spaced, integrally formed, steam channels connected at their ends by manifolds, which also connect a plurality of units together, is not specifically taught in the prior art.

Furthermore, the prior art located in a patent search does not disclose any evaporator panels formed by extrusion and having the specific structure of the disclosed evaporator panels.

Nor does the prior art disclose any evaporator panels having tightly compacted integrally formed channels with planar sidewalls. Further, the prior art does not disclose the connection together of a bank of panel sections by the use of headers mounted on each end of the panels and open along the entire length of the bank of panels. These and additional structural features not evident (for example, the method of mounting the channels in their stack) were not found in the prior art.

SUMMARY OF THE INVENTION

The evaporator panels are extruded in sections that can be placed one on top of the other to any desired height. They can be used in falling film evaporators or in distillation units where brine or other distilland flows downwardly over the exterior walls of the panels.

Each of the panels is formed with a plurality of substantially horizontal passages positioned within a pair of smooth parallel exterior walls. The passages are open at their ends and steam headers are located on both ends of the extruded panels to permit a nearly uniform flow of steam throughout the passages within the panels. Thus, a nearly constant steam pressure is provided throughout the panel passages, and a substantially constant temperature is provided on the interior surfaces of the exterior walls of the panels. The constant temperature provides the desired uniform heating and evaporation of portions of the brine as it passes downwardly and over the exterior surfaces of the exterior walls of the panels. The passages within the panels are slightly tilted so that the steam condensate that collects within the passages flows into one of the steam headers located at the end of the passages and is removed through an outlet at the bottom of the header.

The evaporator panel construction provides for parallel steam flow with the advantage of providing nearly equal steam pressure and temperature throughout the panels.

In addition, the evaporator panel greatly reduces fabrication costs by utilizing extruded evaporator panels. By extruding the panels, expensive machining and welding operations are eliminated.

It is therefore an object to provide for an evaporator panel of extruded material with means adapted to provide parallel steam flow for providing equal steam pressure and temperature throughout the panel.

It is a further object of the present invention to provide for an evaporator panel with internal passages having planar sides dimensioned for ultimum high heat transfer which allows for economically low operating temperatures.

It is an additional object of the present invention to provide for a film evaporator panel which simple structure allows for manufacturing at a low cost per square foot and which arrangement offers versatility in use, easy maintenance, cleaning and replacement.

In general the film evaporator panel comprises a plurality of extruded sections mounted on top of one another to form a panel having a smooth front exterior surface and a smooth back exterior surface. Each extruded section defines a pair of parallel facing vertical walls, being part of the front and the back exterior surfaces, having at spaced intervals integrally connecting a plurality of substantially horizontally extending strips so that a plurality of substantially horizontal passages are formed having a substantially rectangularly shaped cross-sectional configuration with planar interior surfaces. The panel has a substantial first vertical side and a substantial second vertical side; the passages in the extrusions have open ends at both said vertical sides of the panel. A first steam header and a second steam header mounted to said extrusions are forming said first vertical side and said second vertical side respectively and permit a uniform flow of steam-input to both open ends of the passages and throughout the passages so that constant steam pressure is provided on the interior planar surfaces and thus a substantially constant temperature on the planar vertical interior surfaces of the rectangularly shaped passages, and causing a subsequently high heat transfer to the smooth front exterior and the smooth back exterior surfaces of the panel. Furthermore, the strips are spaced at equal distant intervals from one another so that the cross-sectional configurations of the horizontally extended passages are identical. The top strip and the bottom strip form each the extruded section top edge surface and bottom edge surface respectively. Also, the substantially horizontally extended passages are slightly tilted towards the first steam header so that steam condensate formed in the passages flows toward and is collected by the first header. At least one of the steam headers is provided with a steam inlet means and provided with a condensate output means. In addition, the extruded sections and the plurality of horizontally extending passages include a continuous passageway following the panel inside periphery by means of the first steam header, the passage next to the bottom edge surface of the bottom extruded section, the second steam header and the passage next to the top edge surface of the top extruded section for input of steam vapor. It appeared further that the horizontally extended strip interconnecting interior planar surfaces dimensions and the interior vertical planar surfaces dimensions ratio for optimum evaporation performance approximates 2 to 3. In order to provide for equal temperature distribution throughout the panel, the top strip and the bottom strip of each extruded section has a thickness substantially equal to half of the other interconnecting strips so that equal material thickness exists for all strips. Thus, the plurality of passages form a bank of tightly compacted integrally formed passages with planar sidewalls, open along its entire sides, and with steam headers welded in fluid communication with the passages.

As preferred, the evaporator panel passage planar surfaces form a substantially rectangularly cross-section configuration wherein each opposed set of surfaces belong to an identical material of substantially identical thickness so that uniform input temperature transfer from each of the passage interior to the exterior surface remains constant and accordingly forms a relative equilaterally evaporating and condensing action.

Further objects and advantages will become apparent by the following description of the invention, read in conjunction with the accompanying drawings illustrating the preferred arrangement wherein like reference characters are used throughout the various views.

THE DRAWINGS

DESCRIPTION OF THE INVENTION

In order to describe the operation of the overall desalination system and to understand the reasons for the specific construction of the presently disclosed unique film evaporator panel and over-flow header, a short explanation of the desalination system is deemed necessary for introduction.

Figure 1:
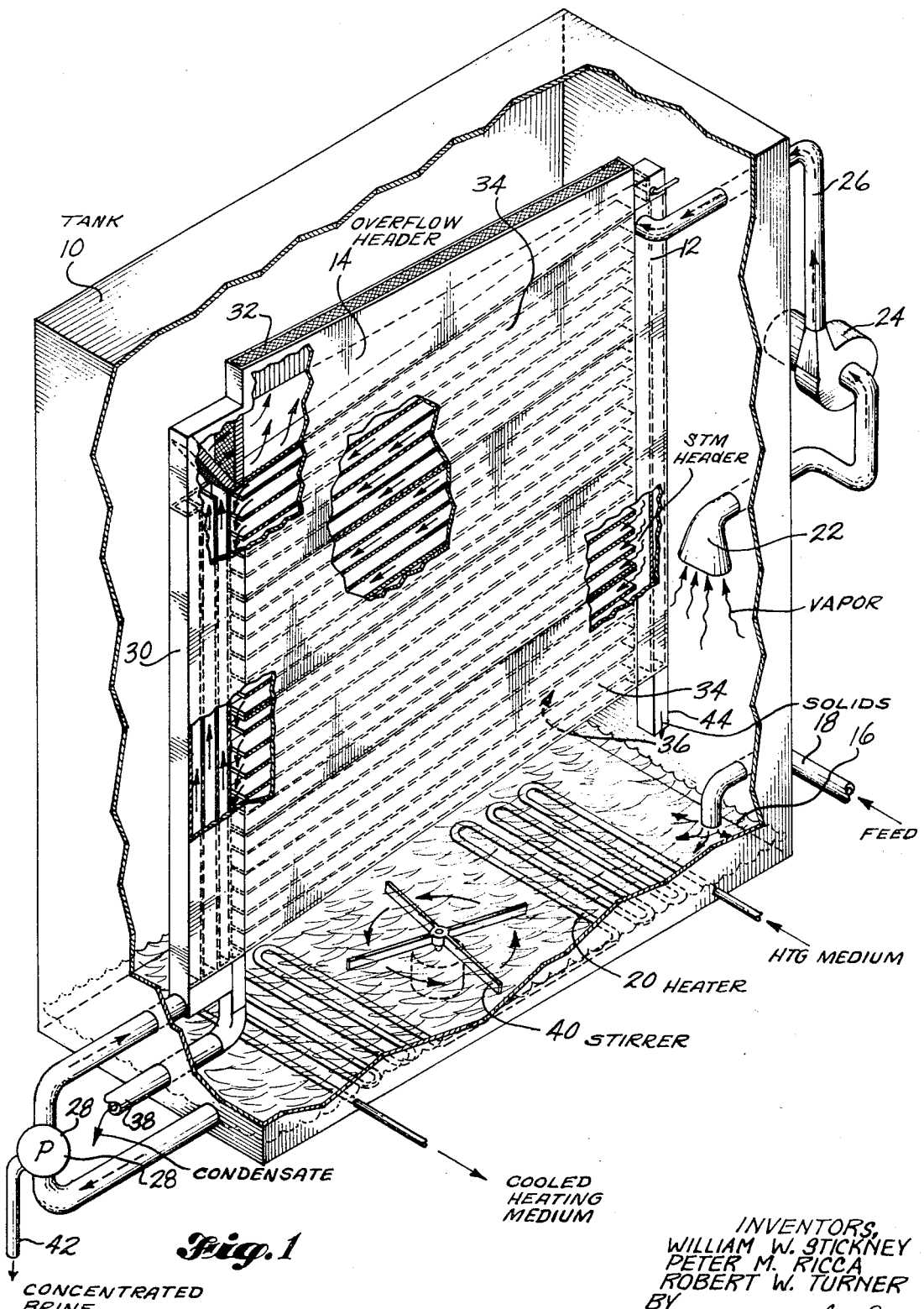
FIG. 1 is an isometric view, partially in section, of a desalination apparatus embodying thee smooth-sided constant pressure temperature film evaporator panel representing the invention.

Referring specifically to FIG. 1, the system comprises a tank 10 containing a film evaporator panel 12 with an overflow header 14. Sea water or brine 16 at preheated temperatures just below the boiling point is drawn into the tank 10 through input pipe 18. A heater means 20 at the tank bottom serves to increase the brine temperature to the boiling point and the resultant steam of the boiling brine is sucked up through the steam inlet 22 of the steam compressor 24. The compressed steam increases in temperature and is fed into the film evaporator panel 12 through conduit 26. The internal arrangement of the film evaporator panel 12 is so designed that a nearly equal steam pressure and temperature throughout the whole panel 12 exists. Simultaneously, the pump 28 mounted next to the tank 10 will feed a portion of the brine via input channels 30 to the overflow header 14. This header is specifically designed to receive the brine 16, which will serve as a distilland, and discharge the brine 16 in a uniform volumetric flow per unit area from the surface portion of the fluid header exit means 32 so that a brine film of equal thickness, in uniform distribution flows downward covering both vertically extending exterior smooth surfaces 34 and 36 of the entire film evaporator panel. As a result, this flow of boiling brine will condense the interior steam and also evaporate as exterior steam. The condensate will be collected at one side of the panel and disposed via fresh water conduit 38 as being the main product in a desalination system.

In order that the sodium chloride of the brine in the tank does not settle, a stirring means 40 is provided at the bottom of the tank 10. Furthermore, part of the brine 16 is being expelled by pump 28 exit means 42, so that input and output is maintained at equilibrium and the sodium chloride level does not exceed a predetermined level. Solids, collected in the header 14, are disposed via means 44.

Figure 2:
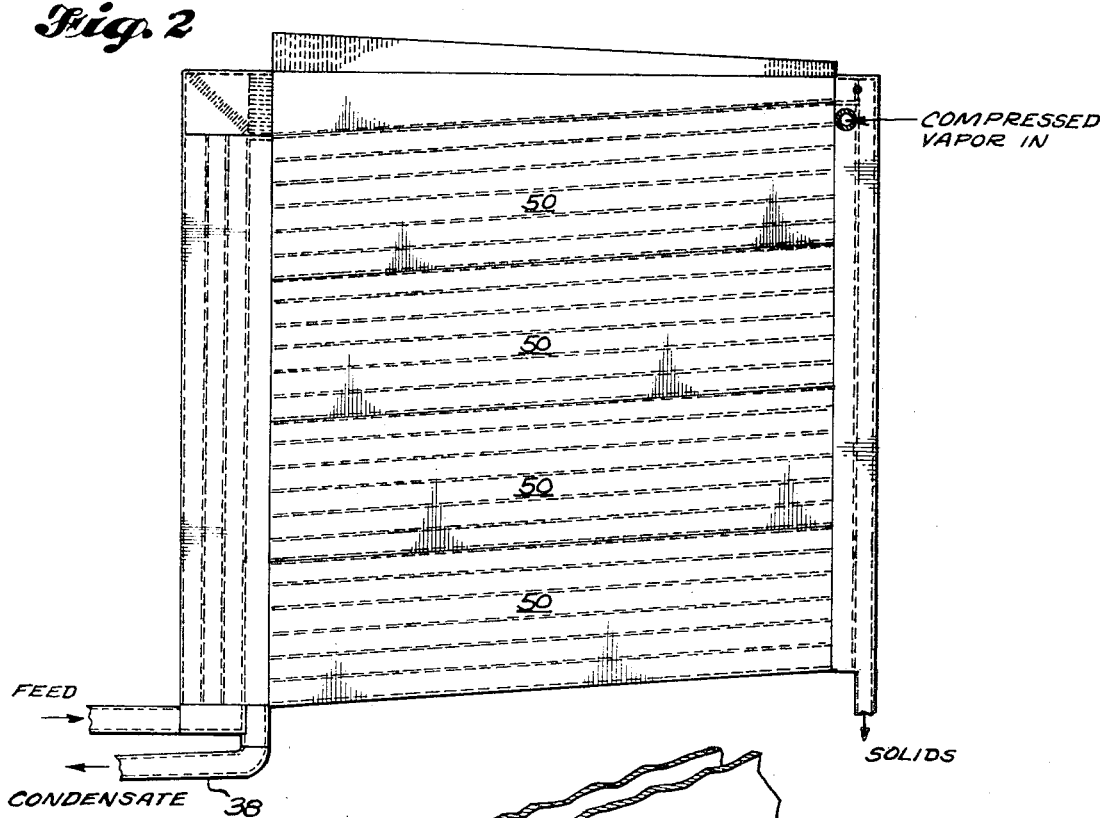
FIG. 2 is a side view of the film evaporator panel.
Figure 3:
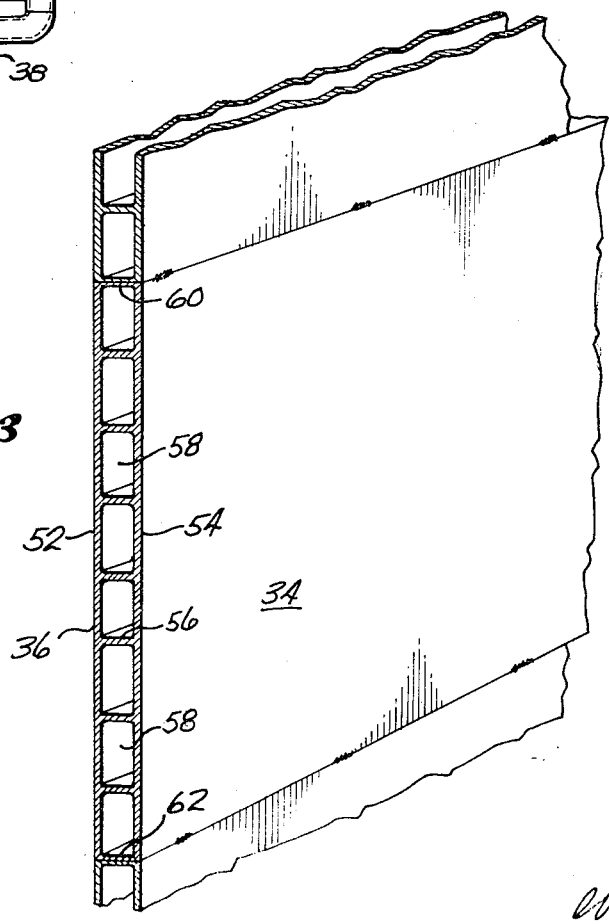
FIG. 3 is a perspective view of a portion of the evaporating panel with the extruded sections mounted together.

As mentioned, the film evaporator panel 12 is specifically constructed so that the various advantages of high heat transfer, constant pressure and temperature, easy manufacture, economic maintenance, etc., can be achieved. The specific structure is illustrated in more detail by FIGS. 2 and 3. The film evaporator panel shows a plurality of extruded sections 50 mounted on top of one another. Each section 50 has vertical facing walls 52 and 54 which form the panel walls 34 and 36. Horizontally extending strips 56 at equal intervals form the rectangular passages 58.

In the preferred form, all thicknesses of the passages are equal; for instance, by having the interconnected upper and bottom extrusion strips 60 and 62 of half of the thickness of the strips 56. When all extruded sections 50 are assembled, the steam vapor can travel inside the perimeter of the panel and form an equal steam input and pressure throughout the whole panel thus creating a substantially equal temperature and pressure containing steam blanket throughout the bank of passages.

While a preferred embodiment of the invention has been illustrated by way of example in the drawings and particularly described, it will be understood that the design of a plant in accordance with the invention may be varied in accordance with the requirements of each installation and that various modifications may be made within the scope of the appended claims.

Now, therefore, we claim:

1. A film evaporator panel comprising:
 a. a plurality of flat extruded sections disposed on edge on top of one another to form an upright panel-like member having a top and a bottom and vertical ends;

b. each of said extruded sections having spaced parallel vertical front and back walls integrally connected by a plurality of substantially horizontal vertically spaced cross strips extending from end to end of the section to form parallel interior passageways across it;

c. said front and back walls having smooth exterior surfaces for downwardly flowing films of cooling liquid thereover; and d. a pair of vertical headers, one of which is secured to one end of said panel-like member and the other of which is secured to the opposite end of said member to form the ends of said panel;

e. each of said headers being provided with a vertical channel sealingly communicating with the adjacent ends of said passageways; and f. one of said channels having an inlet for steam for said passageways and the lower end of the other channel having an outlet for condensate from said passageways.

2. A film evaporator panel according to claim 1, wherein said cross strips in said panel-like member are spaced apart equal distances so that all of said passages are the same size.

3. A film panel according to claim 1, wherein one of said headers is provided with an additional vertical passageway therethrough having an inlet at its lower end for a cooling liquid and an outlet at its upper end, said panel including an overflow trough mounted on top of said panel-like member and having an inlet at one end for receiving liquid from said outlet of said vertical passage, whereby liquid overflowing the trough can flow down its outer surfaces and said smooth exterior surfaces of said extruded sections.

4. A film evaporator panel according to claim 1, wherein said passages have a substantially rectangularly shaped cross-sectional configuration with planar walls.

5. A film evaporator panel according to claim 4, wherein the ratio of width to height of each of said passages approximates two to three.

6. A film evaporator panel according to claim 1, wherein the top and bottom of each of said extruded sections are each formed by one of said cross strips.

7. A film evaporator panel according to claim 6, wherein the bottom cross strip of each extruded section is mounted in abutting relationship on the top cross strip of the extruded section below it.

8. A film evaporator panel according to claim 7, wherein the thickness of each of said top and bottom cross strips is substantially half the thickness of the rest of said cross strips.

* * * * *